United States Patent Office 3,542,872
Patented Nov. 24, 1970

3,542,872
1-AMINO SUBSTITUTED PHENOXY-2-HYDROXY-3-ISOPROPYLAMINO-PROPANES
Herbert Koppe, Ingelheim, Albrecht Engelhardt, Mainz, Gerhard Ludwig, Wedel, and Karl Zeile, Ingelheim, Germany, assignors to Boehringer Ingelheim G.m.b.H., Ingelheim am Rhein, Germany
No Drawing. Application Feb. 28, 1967, Ser. No. 619,141, now Patent No. 3,459,782, dated Aug. 5, 1969, which is a continuation-in-part of application Ser. No. 391,012, Aug. 20, 1964. Divided and this application Feb. 23, 1968, Ser. No. 707,452
Int. Cl. C07c 93/06
U.S. Cl. 260—570.7        21 Claims

ABSTRACT OF THE DISCLOSURE

1 - amino substituted phenoxy - 2 - hydroxy - 3 - N-isopropylamino-propanes and acid additional salts thereof, possessing bradycardia activity and N-isopropyl-nor adrenaline antagonistic activity.

PRIOR APPLICATIONS

The present application is a divisional application of our copending, commonly assigned application Ser. No. 619,141, filed Feb. 28, 1967, and now U.S. Pat. No. 3,459,782, filed Aug. 5, 1969, which in turn is a continuation-in-part application of copending commonly assigned, application Ser. No. 391,012, filed Aug. 20, 1964, now abandoned.

The invention relates to novel 1-aryloxy-2-hydroxy-3-isopropylamino-propanes and acid addition salts thereof, as well as to various methods of preparing these compounds.

More particularly, the present invention relates to racemic 1-substituted phenoxy 2 - hydroxy - 3 - isopropyl-amino-propanes of the formula

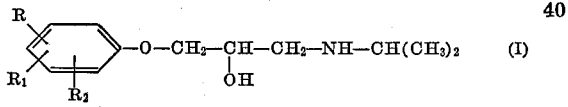

wherein R is selected from the group consisting of hydrogen, halogen, alkyl and alkoxy of 1 to 4 carbon atoms, hydroxyalkyl of 1 to 4 carbon atoms, hydroxycarbonyl, alkoxycarbonyl of 1 to 4 carbon atoms, alkenyl and alkynyl of 2 to 4 carbon atoms, alkylthio of 1 to 4 carbon atoms and cyano, $R_1$ is —$(CH_2)_x$—$NH_2$, $x$ is an integer from 0 to 3 and $R_2$ is selected from the group consisting of hydrogen, halogen, alkyl and alkoxy of 1 to 4 carbon atoms, their optically active isomers and non-toxic, pharmaceutically acceptable acid addition salts of said racemates and of said optically active isomers.

The compounds according to the present invention may be prepared by a number of different methods involving known chemical reaction principles; however, among these, the following methods have been found to be most convenient and efficient:

Method A

By reacting an epoxide of the formula

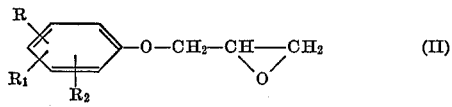

where the R's have the same meanings as in Formula I, with isopropylamine in the presence of an inert solvent, such as ethanol.

Method B

By reacting a 1 - substituted phenoxy - 2 - hydroxy-3-halo propane of the formula

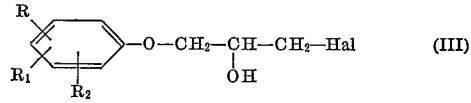

wherein the R's have the same meanings as in Formula I and Hal is halogen, with isopropylamine in the presence of an inert solvent, such as ethanol.

Method C

By hydrolizing an oxazolidinone of the formula

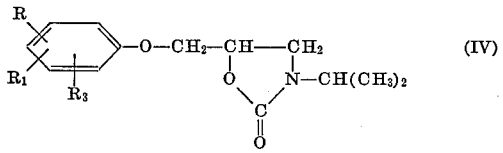

wherein the R's have the same meanings as in Formula I.

Method D

By hydrogenating a 1 - substituted phenoxy - 2 - hydroxy - 3 - benzylisopropylamino - propane of the formula

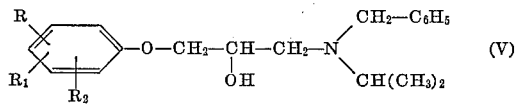

wherein the R's have the same meanings as in Formula I.

Method E

By reducing a 1 - substituted phenoxy - 2 - hydroxy-3-isopropylamino-propane of the formula

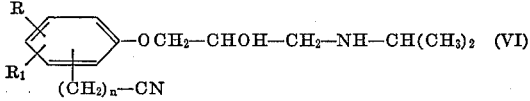

wherein the R's have the same meanings as in Formula I and $n$ is an integer from 0 to 2, which leads to compounds of Formula I wherein $x$ is an integer from 1 to 3.

Method F

By reducing a nitro compound of the formula

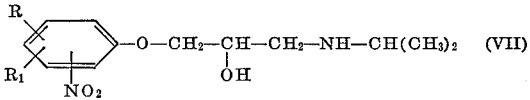

wherein the R's have the same meanings as in Formula I, with catalytically activated hydrogen, which leads to compounds of Formula I, wherein $x$ is 0, i.e. $R_2$ is $NH_2$.

The starting compounds of Formula II to VII for the above methods are known compounds or may readily be prepared by known methods. For example, the starting compounds of Formulas VI and VII may be prepared by reacting a corresponding nitro-, cyano- or cyanoalkyl-substituted phenol under alkaline conditions with a 1-halo-2,3-epoxy-propane such as epichlorohydrin and reacting the 1-(nitro-, cyano- or cyano-alkyl substituted) phenoxy-2,3-epoxy-propane thus obtained with isopropylamine.

Most of the phenols used are known in the prior art and they are easily obtainable by conventional methods. Unsubstituted cyano-phenols, and cyano-phenols substituted with alkyl and/or alkoxy groups, may be prepared by splitting off water from the correspondingly substituted phenolic benzaldoximes which are prepared from known phenolic benzaldehydes. Cyanophenols with an allyl substituent are obtained by reacting the cyanophenol with allyl bromide with rearrangement of the intermediate allyl ether into the final product. Halocyanophenols are obtained by reacting the cyanophenol with a hydrogen halide in the presence of $H_2O_2$. Cyanomethylphenols can be made by introducing a nitro group into a benzylnitrile and converting it into a phenol group by reducing, diazotizing and boiling down. The starting material of Formula II may be obtained by reducing the above mentioned 1-(nitro-, cyano- or cyanoalkyl) phenoxy-2,3-epoxypropanes. Other starting material may be obtained analogous to processes described in Belgian Pat. No. 641,133, British Pat. No. 894,198 and in the literature.

The free bases of the Formula I obtained by any of the above methods, A through F, may subsequently be transformed into non-toxic, pharmacologically acceptable acid addition salts by conventional methods, that is, by acidifying a solution of the free base with the desired acid and recovering the acid addition salt by evaporation of the solvent or by precipitation, for instance.

Examples of non-toxic, pharmacologically acceptable acid addition salts of the bases are those formed with hydrochloric acid, hydrobromic acid, sulfuric acid, phosphoric acid, methane sulfonic acid, acetic acid, lactic acid, tartaric acid, ascorbic acid, 8-chlorotheophylline and the like.

The following examples further illustrate the present invention and will enable others skilled in the art to understand it more completely. It should be understood, however, that our invention is not limited to the specific examples gives below.

EXAMPLE I

Preparation of 1-(2-amino-5-methoxyphenoxy)-2-hydroxy-3-isopropylamino-propane·2HCl 5.68 (0.02 mol) of 1-(2-nitro-5-methoxyphenoxy)-2-hydroxy-3-isopropylamino-propane were dissolved in 200 ml. of methanol and hydrogenated at room temperature over Raney-nickel. After sucking off the catalyst, the clear solution was evaporated in vacuo, whereby 5.6 g. of basic residue was obtained. The residue was dissolved in ethanol, mixed with ethereal HCl and the resulting crystalline 1-(2-amino-5-methoxyphenoxy)-2-hydroxy-3-isopropylamino-propane dihydrochloride was isolated. It was recrystallized from ethanol under addition of ether to obtain 3.5 g. (53% of theory) having a melting point of 223–225° C.

EXAMPLE II

Preparation of 1-(4-aminomethylphenoxy)-2-hydroxy-3-isopropylamino-propane·2HCl

Step A.—1-(4-cyanophenoxy)-2-hydroxy-3-isopropylaminopropane: 21.2 gm. (0.112 mol) of 1-(4-cyanophenoxy)-2,3-epoxy-propane dissolved in 150 ml. of methanol was reacted with 17.7 gm. (0.3 mol) of isopropylamine by standing for 1 hour at room temperature and then heating to reflux. Then the solvent was distilled off in vacuo, the residue was digested with dilute HCl and the not completely clear solution was filtered over Celite. The thus purified aqueous phase was made alkaline with NaOH and the precipitated base was extracted by ether. The ethereal phase was washed with water and after drying over $MgSO_4$ was evaporated in vacuo. The solid residue was recrystallized from ethylacetate/petroleum ether to obtain the said free base whose hydrochloride had a melting point of 157–159° C.

Step B.—Preparation of 1-(4-aminomethylphenoxy)-2-hydroxy-3-isopropylamino-propane·2HCl: 22.2 g. (0.095 mol) of 1-(4-cyanophenoxy)-2-hydroxy-3-isopropylamino-propane were dissolved in 200 ml. of methanol. Ammonia was added thereto and the mixture was hydrogenated over Raney-nickel at a hydrogen pressure of 21 atmospheres at 20° C. After filtering off the catalyst, the solvent was distilled off in vacuo and the only residue was dissolved in ethanol and acidified with alcoholic HCl. The solution was filtered hot and then cooled to obtain 18.1 g. (61.5% of theory) of 1-(4-aminomethylphenoxy)-2-hydroxy-3-isopropylamino-propane dihydrochloride in the form of colorless crystals having a melting point of 241 to 244° C.

EXAMPLE III

Preparation of 1-(3-aminomethylphenoxy)-2-hydroxy-3-isopropylamino-propane·2HBr

Step A.—Preparation of 1-(3-cyanophenoxy)-2-hydroxy-3-isopropylamino-propane·HCl: Using the procedure of Example II, 1-(3-cyanophenoxy)-2,3-epoxy-propane was reacted with isopropylamine to obtain 1-(3-cyanophenoxy)-2-hydroxy-3-isopropylamino-propane whose maleinate had a melting point of 88 to 92° C.

Step B.—Preparation of 1-(3-aminomethylphenoxy)-2-hydroxy-3-isopropylamino-propane·2HBr: 13 g. (0.055 mol) of 1-(3-cyanophenoxy)-2-hydroxy-3-isopropylamino-propane were hydrogenated and worked up as in Example II. The basic residue was dissolved in isopropanol and treated with HBr and filtered to obtain 12.5 g. (57% of theory) of colorless 1-(3-aminomethylphenoxy)-2-hydroxy-3-isopropylamino-propane dihydrobromide having a melting point of 178 to 181° C.

EXAMPLE IV

Preparation of 1-(2-chloro-5-aminophenoxy)-2-hydroxy-3-isopropylamino-propane·2HCl Using the process of Example I, 1-(2-chloro-5-nitrophenoxy)-2-hydroxy-3-isopropylamino-propane was hydrogenated and worked up to obtain 1-(2-chloro-5-aminophenoxy)-2-hydroxy-3-isopropylamino-propane dihydrochloride having a melting point of 175–178° C.

EXAMPLE V

Preparation of 1-(4-aminophenoxy)-2-hydroxy-3-isopropyl-amino-propane·2HCl

Using the procedure of Example I, 1-(4-nitro-phenoxy)-2-hydroxy-3-isopropylamino propane was reacted with Raney-nickel/$H_2$ to obtain 1-(4-aminophenoxy)-2-hydroxy-3-isopropylamino-propane dihydrochloride having a melting point of 240–241° C.

EXAMPLE VI

Preparation of 1-(2-aminophenoxy)-2-hydroxy-3-isopropylamino-propane·2HCl

Using the procedure of Example I, 1-(2-amino-phenoxy-2-hydroxy-3-isopropylamino-propane was prepared from 1-(2-nitrophenoxy)-2-hydroxy-3-isopropylamino-propane. Its dihydrochloride had a melting point of 216–219° C.

EXAMPLE VII

Preparation of 1-(3-aminophenoxy)-2-hydroxy-3-isopropylamino-propane

Using the procedure of Example I, 1-(3-nitrophenoxy-2-hydroxy-3-isopropylamino-propane was prepared with Raney-nickel/$H_2$ to obtain 1-(3-aminophenoxy)-2-hydroxy-3-isopropylaminopropane having a melting point of 91–92° C.

EXAMPLE VIII

Preparation of 1-(2-methyl-5-aminophenoxy)-2-hydroxy-3-isopropylamino-propane·2HCl 13.4 g. (0.05 mol) of 1-(2-methyl-5-nitrophenoxy)-2-hydroxy-3-isopropylamino-propane were dissolved in 150 ml. of methanol and hydrogenated over Raney-nickel at room temperautre and at atmospheric pressure. After the catalyst had been separated, the solvent was distilled in vacuo. The oily residue (8.6 g.=72% of theory) was dissolved in a small amount of methanol and admixed with ethereal hydrochloric acid. Then the dihydrochloride salt precipitating in crystalline form was vacuum filtered and recrystallized from methanol with an addition of ether to obtain 10.7 g. (68.5% of theory) of 1-(2-methyl-5-aminophenoxy)-2 - hydroxy-3-isopropylamino-propane dihydrochloride having a melting point of 240–241° C.

EXAMPLE IX

Preparation of 1-(2-chloro-4-aminophenoxy)-2-hydroxy-3-isopropylamino-propane·2HCl 7.25 g. (0.025 mol) of 1-(2-chloro-4-nitrophenoxy)-2-hydroxy-3-isopropylamino-propane were dissolved in 100 ml. of methanol and hydrogenated under atmospheric pressure and at room temperature with hydrogen and a Raney-nickel catalyst. After the catalyst had been removed, the solvent was distilled off in vacuo and the residue was dissolved in a small amount of methanol and admixed with ethereal hydrochloric acid. The crystalline precipitate was vacuum filtered and recrystallized from methanol/ether to obtain 4.5 g. (51% of theory) of 1-(2-chloro-4-aminophenoxy)-2-hydroxy - 3 - isopropylamino-propane dihydrochloride having a melting point of 210°–212° C.

EXAMPLE X

Preparation of 1-(3-methyl-4-aminophenoxy)-2-hydroxy-3-isopropylamino-propane·2HCl 6.7 g. (0.025 mol) of 1-(3-methyl-4-nitrophenoxy)-2-hydroxy-3-isopropylamino-propane were dissolved in 70 ml. of ethanol and hydrogenated with a Raney-nickel catalyst at room temperature under atmospheric pressure. After the catalyst had been removed, the solvent was distilled off in vacuo and the solid residue was recrystallized from a mixture of ethyl acetate and petroleum ether. The crystalline base was vacuum filtered and dissolved in a small amount of methanol. Then, ethereal hydrochloric acid was added thereto and the crystals formed were isolated and dried to obtain 4 g. of 1-(3-methyl-4-amino-phenoxy)-2-hydroxy - 3-isopropylamino-propane dihydrochloride having a melting point of 248–251° C.

EXAMPLE XI

Preparation of 1-(2,4-dichloro-3-aminophenoxy)-2-hydroxy-3-isopropylamino-propane·2HCl Using the procedure of Example IX, 1-(2,4-dichloro-3-nitrophenoxy)-2-hydroxy - 3 - isopropylamino-propane was hydrogenated in methanol with a Raney-nickel catalyst to obtain 1-(2,4-dichloro-3-aminophenoxy)-2-hydroxy-3-isopropylamino-propane. Its dihydrochloride had a melting point of 130–133° C.

The starting material was prepared by reacting 2,4-dichloro-3-nitrophenol with epichlorohydrin and reacting the 1-(2,4-dichloro-3-nitrophenoxy) - 2,3-epoxypropane thus obtained with isoproplyamine.

EXAMPLE XII

Preparation of 1-(3-methyl-4-aminophenoxy)-2-hydroxy-3-isopropylamino-propane·2HCl 2.64 g. (0.01 mol) of 3-isopropyl-5-(3-methyl-4-aminophenoxymethyl)-oxazolidinone (2) were heated under reflux for 3 hours in a mixture consisting of 15 ml. ethanol, 5 ml. water and 2.8 g. (0.05 mol) KOH while stirring. After distilling off the ethanol, the solidifying residue was separated from the aqueous compounds and washed with water. The dry crystallization product was dissolved in methanol and mixed with HCl in ether. The hydrochloride precipitating was again recrystallized as above. Yield 1.95 g.=62.5% of theory, melting point of the dihydrochloride: 245–248° C.

The starting material may be prepared analogous to methods described in British Pat. 894,198.

EXAMPLE XIII

Preparation of 1-(2-methoxy-4-aminophenoxy)-2-hydroxy-3-isopropylamino-propane-oxalate Using the procedure of Example I, 1-(2-methoxy-4-nitrophenoxy)-2-hydroxy-3-isopropylamine was hydrogenated in methanol with a Raney-nickel catalyst to obtain 1-(2-methoxy-4-aminophenoxy) - 2 - hydroxy-3-isopropylaminopropane. The oxalate was obtained by adding oxalic acid in ether to a solution of the base in methanol, it has a melting point of 146–147° C.

The starting material was obtained by reacting 2-methoxy-4-nitrophenol with epichlorohydrine and reacting the 1-(2-methoxy-4-nitrophenoxy)-2,3-epoxypropane thus obtained with isopropylamine.

EXAMPLE XIV

Preparation of 1-(3-amino-4-methoxyphenoxy)-2-hydroxy-3-isopropylamino-propane·2HCl Using the procedure of Example I, 1-(3-nitro-4-methoxyphenoxy)-2-hydroxy-3-isopropylamino-propane was hydrogenated in methanol with a Raney-nickel catalyst to obtain 1-(3-amino-4-methoxyphenoxy)-2-hydroxy-3-isopropylamino-propane. The dihydrochloride was obtained by adding HCl in ether to a solution of the base in methanol and had a melting point of 215–217° C.

The starting material was obtained by reacting 3-nitro-4-methoxyphenol with epichlorohydrin and reacting the resulting epoxide with isopropylamine.

EXAMPLE XV

Preparation of 1-(2-aminomethylphenoxy)-2-hydroxy-3-isopropylamino-propane·2HCl

Step A.—1-(2 - cyanophenoxy)-2-hydroxy-3-isopropyl-amino-propane: 26.2 g. (0.15 mol) of 1-(2-cyanophenoxy)-2,3-epoxypropane (prepared by reacting 2-cyanophenol with epichlorohydrin in the presence of NaOH) were dissolved in 150 ml. of ethanol and then 23.6 g. (0.4 mol) of isopropylamine were added thereto. After the mixture had stood for 10 hours at room temperature, it was heated at reflux for 3 hours. Then, the solvent was distilled off in vacuo, and the residue was taken up in dilute hydrochloric acid and the solution vacuum filtered from the insoluble matter. The aqueous acid phase was made alkaline with sodium hydroxide and the base precipitating in oily form was extracted several times with ether. The ether extracts were combined and dried over sodium sulfate and the ether was distilled off to obtain 26 g. of raw 1-(2-cyanophenoxy)-2-hydroxy-3-isopropylaminopropane. The product obtained was recrystallized from ethyl acetate with an addition of petroleum ether. The hydrochloride of the base thus obtained had a melting point of 135° C.

Step B.—Preparation of 1-(2-aminomethylphenoxy)-2-hydroxy-3-isopropylaminopropane·2HCl: 22.2 g. (0.095 mol) of 1-(2-cyanophenoxy)-2-hydroxy-3-isopropylaminopropane were dissolved in 200 ml. of methanol. Ammonia was added thereto and the mixture was hydrogenated over Raney-nickel at a hydrogen pressure of 21 atmospheres at 20° C. After filtering off the catalyst, the solvent was distilled off in vacuo and the oily residue was dissolved in ethanol and acidified with ethanolic HCl. The solution was filtered hot and then cooled to obtain the 1-(2-aminomethylphenoxy)-2-hydroxy - 3 - isopropylamino-propane dihydrochloride. Yield: 17.4 g., melting point: 176–179° C.

EXAMPLE XVI

Preparation of 1-(2-amino-4-chlorophenoxy)-2-hydroxy-3-isopropylamino-propane·2HCl 6.4 g. (0.022 mol) of 1-(2-nitro-4-chlorophenoxy)-2-hydroxy-3-isopropylamino-propane were dissolved in 100 ml. of methanol and hydrogenated over Raney-nickel at atmospheric pressure and at room temperature. After the Raney-nickel had been vacuum filtered off, the methanol was distilled off in vacuo. The residue was dissolved in methanol, acidified with ethereal hydrochloric acid and a small amount of ether was added thereto to obtain 5.3 g. of 1-(2-amino - 4 - chlorophenoxy)-2-hydroxy-3-isopropylamino-propane dihydrochloride having a melting point of 243–247° C.

EXAMPLE XVII

Preparation of 1-(3-amino-4-methylphenoxy)-2-hydroxy-3-isopropylamino-propane·2HCl Using the procedure of Example X, 1-(3-nitro-4-methylphenoxy)-2-hydroxy-3-isopropylamino-propane was hydrogenated in ethanol with a Raney-nickel catalyst to obtain 1-(3-amino - 4 - methylphenoxy)-2-hydroxy-3-isopropylamino-propane. Its dihydrochloride had a melting point of 216–218° C.

The compounds according to the present invention, that is, those embraced by Formula I and their non-toxic, pharmacologically acceptable acid addition salts, have useful pharmacodynamic properties. More particularly, they produce bradycardia and at the same time act as N-isopropyl-noradrenaline (Isoproterenol) antagonists. Thus, the tachycardiac effects caused by the administration of N-isopropyl-noradrenaline are suppressed or eliminated by prior administration of one of the compounds of the present invention, and cardiac arrhythmia are equalized by them. In other words, the compounds according to the present invention block the sympathetic nervous system of the heart. Consequently, the areas of utility for the compounds of the present invention are hypertension, angina pectoris, cardiac arrhythmia, digitalis intoxication and pheochromocytoma disorders.

In view of the presence of an asymmetric carbon atom in the 2-position of the propylene chain, the compounds of the present invention exist not only in the form of racemic mixtures but also in the form of optical antipodes. The optical antipodes may be separated from the racemates by conventional methods and have the same pharmocodynamic properties as the racemates.

For therapeutic purposes in warm-blooded animals, the compounds of the present invention are administered perorally or parenterally as active ingredients in conventional dosage unit compositions, that is, compositions in dosage unit form consisting essentially of a major amount of an inert pharmaceutical carrier and one dosage unit of the active ingredient. Dosages of the compounds pursuant to the present invention is from 0.01 to 5 mgm./kg., depending upon the route of administration and the intensity of the effect desired or required. Thus for oral administration, the dosage range is 0.4–5 mgm./kg., preferably 1–3 mgm./kg.; for intravenous administration it is 0.01–0.2 mgm./kg., preferably 0.02–0.1 mgm./kg.; and for subcutaneous administration it is 0.02–1.0 mgm./kg., preferably 0.1–0.3 mgm./kg. Typical examples of dosage compositions are tablets, coated pills, suspensions, solutions, suppositories and the like.

PHARMACEUTICAL EXAMPLES

Example A 40.0 g. of racemic 1-(2-aminophenoxy)-2-hydroxy-3-isopropylamino-propane hydrochloride, 16.40 g. of corn starch, 240.0 g. of calcium phosphate and 1.0 g. of magnesium stearate were thoroughly admixed and then granulated in the conventional manner. The granulate was then pressed into 1,000 tablets weighing 445 mg. each and containing 40 mg. of the active ingredient.

Example B 25.0 g. of (—)-1-(2-aminophenoxy) - 2-hydroxy-3-isopropylamino-propane hydrochloride and 175 g. of corn starch were thoroughly admixed. The mixture was then used to fill gelatin capsules with 200 mg. of the mixture.

Each capsule contained 25 mg. of the optically active ingredient.

Example C 2.5 parts by weight of racemic 1-(3-amino-4-methylphenoxy)-2-hydroxy-3 - isopropylamino-propane hydrochloride and 0.2 part by weight of sodium salt of ethylene diamine tetraacetic acid were dissolved in distilled water and the volume was adjusted to 100 parts. The solution was filtered until free from suspended particles and filled into 1 cc. ampoules under aseptic condition. The ampoules were sterilized and sealed. Each ampoule contained 25 mg. of the active ingredient.

Example D 25.0 g. of racemic 1-(2-amino-5-methoxyphenoxy)-2-hydroxy - 3-isopropylamino-propane maleinate, 295.0 g. of carboxymethyl cellulose and 20.0 g. of stearic acid were thoroughly admixed and the mixture was granulated using a solution of 40.0 g. of cellulose acetatephthalate in 200 ml. of an ethanol and ethyl acetate mixture. The granulate was then pressed into cones weighing 380 mg. which were coated with a sugary 5% solution of polyvinylpyrrolidone in water in the usual fashion. Each coated pill contained 25 mg. of active ingredient.

Example E 50.0 g. of 1-(4-aminomethylphenoxy) - 2-hydroxy-3-isopropylamino-propane sulfate, 16.40 g. of lactose, 194.0 g. of corn starch, 14.0 g. of colloidal silic acid and 6.0 g. of polyvinylpyrrolidone were thoroughly admixed and the mixture was granulated with an aqueous solution containing 10 g. of soluble starch in the usual manner. The granulate was admixed with 2.0 g. of magnesium stearate and pressed into 440 mg. tablets containing 50 mg. of the active ingredient.

Although the above illustrative dosage unit compositions comprise only a few of the compounds of the present invention as an active ingredient, it should be understood that any of the other compounds embraced by Formula I or a nontoxic acid addition salt thereof, either in the racemic or in the optically active d- or l-form, may be substituted therefor in Examples A to E. Moreover, the amounts of the active ingredient in the illustrative examples may be varied within the indicated limits to meet particular requirements, as may the amounts and nature of the inert ingredients.

PHARMACOLOGICAL DATA

The compounds were tested for β-andrenergic blocking activity in adult laboratory guinea pigs under urethane anesthesia.

The bradycardia activity of the compounds was determined by administering the test compounds by intravenous injection at 5 progressively increasing dosages (0.1 mg./kg., 0.3 mg./kg., 1 mg./kg., 3 mg./kg. and 10 mg./kg. for each compound) to 4 animals per compound and ascertaining the decrease of the basic frequency of the heart beat by means of an electrical recorder.

After each determination of the decrease of the basic frequency, 1γ/kg. of isoproterenol [=α (isopropylaminomethyl) protocatechuyl alcohol] was administered to the same animal by intravenous injection, and the maximum frequency change was determined.

The results of both determinations (bradycardia activity and isoproterenol antagonistic activity) were plotted as a dose activity curve, and the curve for each compound was compared with a corresponding curve for the standard control compound dichloroisoproterenal (DCI), a known effective β-andrenergic blocking agent. The following results were obtained.

TABLE I

| Compound | Bradycardia activity | Isoproterenol-antagonistic activity |
|---|---|---|
| 1-(2-chloro-4-aminophenoxy)-2-hydroxy-3-isopropylamino-propane·2HCl | 7.3×DCI | 8.7×DCI |
| 1-(2-aminophenoxy)-2-hydroxy-3-isopropylamino-propane·2HCl | 5.2×DCI | 2.9×DCI |
| 1-(3-aminomethylphenoxy)-2-hydroxy-3-isopropylamino-propane·2HCl | 4.5×DCI | 11.6×DCI |
| 1-(2-amino-5-methoxyphenoxy)-2-hydroxy-3-isopropylamino-propane·2HCl | 12.9×DCI | 7.0×DCI |
| 1-(2-methoxy-4-aminophenoxy)-2-hydroxy-3-isopropylamino-propane·2HCl | 17.3×DCI | 7.3×DCI |

Various modifications of the compositions and method of the invention may be made without departing from the spirit or scope thereof and it is to be understood that the invention is to be limited only as defined in the appended claims.

We claim:

1. A compound selected from the group consisting of racemic 1-phenoxy-2-hydroxy-3-isopropylamino-propanes of the formula

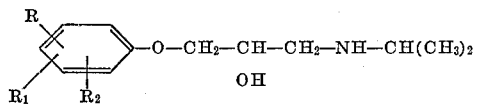

wherein R is selected from the group consisting of hydrogen, halogen, alkyl of 1 to 4 carbon atoms and alkoxy of 1 to 4 carbon atoms, $R_1$ is —$(CH_2)_x$—$NH_2$, $x$ is an integer from 0 to 1 and $R_2$ is selected from the group consisting of hydrogen and halogen, their optically active isomers and nontoxic, pharmaceutically acceptable acid addition salts of said racemates and of said optically active isomers.

2. A compound of claim 1 wherein R and $R_2$ are hydrogen, $R_1$ is —$(CH_2)_x$—$NH_2$ and $x$ is 0.

3. A compound of claim 1 wherein R is methyl, $R_1$ is —$(CH_2)_x$—$NH_2$, $x$ is 0 and $R_2$ is hydrogen.

4. A compound of claim 1 wherein R is chlorine, $R_1$ is —$(CH_2)_x$—$NH_2$, $x$ is 0 and $R_2$ is hydrogen.

5. A compound of claim 1 wherein R and $R_2$ are hydrogen and $R_1$ is —$(CH_2)_x$—$NH_2$ and $x$ is 1.

6. A compound of claim 1 which is selected from the group consisting of racemic 1-(2-amino-5-methoxyphenoxy)-2-hydroxy-3-isopropylamino-propane, its optically active isomers and non-toxic, pharmaceutically acceptable acid addition salts of said racemate and optically active isomers.

7. A compound of claim 1 which is selected from the group consisting of racemic 1-(3-aminomethylphenoxy)-2-hydroxy-3-isopropylamino-propane, its optically active isomers and non-toxic, pharmaceutically acceptable acid addition salts of said racemate and optically active isomers.

8. A compound of claim 1 which is selected from the group consisting of racemic 1-(4-aminophenoxy)-2-hydroxy-3-isopropylamino-propane, its optically active isomers and non-toxic, pharmaceutically acceptable acid addition salts of said racemate and optically active isomers.

9. A compound of claim 1 which is selected from the group consisting of racemic 1-(2-chloro-5-amino-methylphenoxy)-2-hydroxy-3-isopropylamino-propane, its optically active isomers and non-toxic, pharmaceutically acceptable acid addition salts of said racemate and optically active isomers.

10. A compound of claim 1 which is selected from the group consisting of racemic 1-(4-aminomethylphenoxy)-2-hydroxy-3-isopropylamino-propane, its optically active isomers and non-toxic, pharmaceutically acceptable acid addition salts of said racemate and optically active isomers.

11. A compound of claim 1 which is selected from the group consisting of racemic 1-(2-amino-phenoxy)-2-hydroxy-3-isopropylamino-propane, its optically active isomers and non-toxic, pharmaceutically acceptable acid addition salts of said racemate and optically active isomers.

12. A compound of claim 1 which is selected from the group consisting of racemic 1-(3-amino-phenoxy)-2-hydroxy-3-isopropylamino-propane, its optically active isomers and non-toxic, pharmaceutically acceptable acid addition salts of said racemate and optically active isomers.

13. A compound of claim 1 which is selected from the group consisting of racemic 1 - (2 - methyl - 5 - aminophenoxy)-2-hydroxy-3-isopropylamino-propane, its optically active isomers and non-toxic, pharmaceutically acceptable acid addition salts of said racemate and optically active isomers.

14. A compound of claim 1 which is selected from the group consisting of racemic 1-(2-chloro-4-aminophenoxy)-2-hydroxy-3-isopropylamino-propane, its optically active isomers and non-toxic, pharmaceutically acceptable acid addition salts of said racemate and optically active isomers.

15. A compound of claim 1 which is selected from the group consisting of racemic 1-(3-methyl-4-aminophenoxy)-2-hydroxy-3-isopropylamino-propane, its optically active isomers and non-toxic, pharmaceutically acceptable acid addition salts of said racemate and optically active isomers.

16. A compound of claim 1 which is selected from the group consisting of racemic 1-(2-amino-4-chloro-phenoxy)-2-hydroxy-3-isopropylamino-propane, its optically activeactive isomers and non-toxic, pharmaceutically acceptable acid addition salts of said racemate and optically active isomers.

17. A compound of claim 1 which is selected from the group consisting of racemic 1-(3-amino-4-methylphenoxy)-2-hydroxy-3-isopropylamino-propane, its optically active isomers and non-toxic, pharmaceutically acceptable acid addition salts of said racemate and optically active isomers.

18. A compound of claim 1 which is selected from the group consisting of racemic 1-(2,4-dichloro-3-aminophenoxy)-2-hydroxy-3-isopropylaminopropane, its optically active isomers and non-toxic, pharmaceutically acceptable acid addition salts of said racemates and optically active isomers.

19. A compound of claim 1 which is selected from the group consisting of racemic 1(-2-methoxy-4-aminophenoxy)-2-hydroxy-3-isopropylamino-propane, its optically active isomers and non-toxic, pharmaceutically acceptable acid addition salts of said racemates and optically active isomers.

20. A compound of claim 1 which is selected from the group consisting of racemic 1-(3-amino-4-methoxyphenoxy)-2-hydroxy-3-isopropylamino-propane, its optically active isomers and non-toxic, pharmaceutically acceptable acid addition salts of said racemates and optically active isomers.

21. A compound of claim 1 which is selected from the group consisting of racemic 1-(2-aminomethylphenoxy)-2-hydroxy-3-isopropylamino-propane, its optically active isomers and non-toxic, pharmaceutically acceptable acid addition salts of said racemates and optically active isomers.

References Cited

FOREIGN PATENTS 1,198,123  12/1959  France.

ROBERT V. HINES, Primary Examiner

U.S. Cl. X.R.

260—253, 307, 343.7, 348, 465, 471, 501.17, 501.19, 519, 612, 622; 424—253, 280, 304, 309, 330